(12) United States Patent
Giraud (10) Patent No.: US 6,726,058 B2
(45) Date of Patent: Apr. 27, 2004

(54) DISPENSER FOR SOLID OBJECTS

(75) Inventor: Jean Pierre Giraud, Paris (FR)

(73) Assignee: CSP Technologies, Inc., Amsterdam, NY (US)

( * ) Notice: Subject to any disclaimer, the term of this patent is extended or adjusted under 35 U.S.C. 154(b) by 0 days.

(21) Appl. No.: 10/177,786

(22) Filed: Jun. 20, 2002

(65) Prior Publication Data

US 2003/0234260 A1 Dec. 25, 2003

(51) Int. Cl.⁷ .................................. B65H 3/60
(52) U.S. Cl. ........................ 221/267; 221/276
(58) Field of Search ................... 221/263, 264, 221/266, 267, 268, 270, 272, 276, 289, 302, 307, 250

(56) References Cited

U.S. PATENT DOCUMENTS

| | | | | |
|---|---|---|---|---|
| 2,443,861 A | * | 6/1948 | Johnson | 221/279 |
| 2,835,787 A | * | 5/1958 | Mihalyi | 362/10 |
| 3,018,921 A | * | 1/1962 | Hermanson | 221/281 |
| 3,342,318 A | * | 9/1967 | Ruekberg | 206/540 |
| 3,586,208 A | * | 6/1971 | Hussey | 221/299 |
| 3,610,468 A | * | 10/1971 | Borsum | 221/256 |
| 3,620,413 A | * | 11/1971 | Borsum | 221/289 |
| 3,854,625 A | * | 12/1974 | Kuebler | 221/198 |
| 4,129,230 A | * | 12/1978 | Billett et al. | 221/268 |
| 4,133,452 A | * | 1/1979 | Wiltrout | 221/185 |
| 4,405,060 A | * | 9/1983 | Hsei | 221/135 |
| 4,415,098 A | * | 11/1983 | Haas | 221/202 |
| 4,492,316 A | * | 1/1985 | Emms | 221/202 |
| 4,502,612 A | * | 3/1985 | Morrison | 221/185 |
| 4,648,529 A | * | 3/1987 | Blakemore et al. | 221/1 |
| 5,174,471 A | * | 12/1992 | Kozlowski et al. | 221/154 |
| 5,219,095 A | * | 6/1993 | Shimizu et al. | 221/264 |
| 5,259,531 A | * | 11/1993 | Bennett | 221/233 |
| 6,206,235 B1 | * | 3/2001 | Green | 221/251 |

* cited by examiner

Primary Examiner—Donald P. Walsh
Assistant Examiner—Matthew J. Kohner
(74) Attorney, Agent, or Firm—Greenberg Traurig, LLP

(57) ABSTRACT

A dispenser for dispensing solid objects comprising a reservoir for retaining solid objects that is in communication with dispensing zone having a reusable opening and an ejector positioned opposite a space for retaining a solid object, wherein the dispensing zone is positioned under the reservoir, the dispensing zone is defined on an upper side by a first wall of positive slope and a second wall of negative slope, and the reusable opening is on a first side of the dispensing zone and the ejector is on a second side of the dispensing zone that is opposite the first side.

5 Claims, 10 Drawing Sheets

DISPENSER FOR SOLID OBJECTS

FIELD OF THE INVENTION

The present invention is directed to dispensers for solid objects. In one embodiment, the dispenser can be used as a dispenser for pieces of candy. In another embodiment, the dispenser can be used to dispense tablets that, for example, deliver therapeutic substances. In a further embodiment, the dispenser is moisture tight for a desired period (e.g. dispenser's use life, solid objects shelf-stability life).

BACKGROUND OF THE INVENTION

Tablet dispensers are typically employed in the nutritional and candy industries in order to retain and dispense tablets. These dispensers may be designed for specific tablets, such as the PEZ®dispenser for PEZ®candy. Dispensers may be sealed after filling to render them moisture tight for "shelf" stability (i.e. prior to the time the dispenser is opened by the consumer.

Typically, once the consumer opens the packaging (beginning the period of use life), the dispensers are no longer moisture-tight. In other words, during use life, these dispensers are typically only employed in conjunction with tablets and products that are not moisture sensitive during the use life.

Because conventional tablet dispensers are not moisture-tight during use life, they are not typically used in the pharmaceutical industry for moisture sensitive products. Instead, moisture tight tablet packaging has typically been provided by "blister" packs. For "blister packs", the tablet is pushed through a frangible barrier material in order to separate it from the packaging.

SUMMARY OF THE INVENTION

The present invention is directed to a number of embodiments for tablet dispensers that, in some embodiments, maintain a moisture-tight reservoir of tablets during use life. In one example, the design is suited for pharmaceutical applications, particularly where moisture-sensitivity of the tablet is a consideration.

The present invention is directed to dispensers for dispensing tablets. In one embodiment, the dispenser maintains a moisture tight seal both during shelf life and during use life. In yet another embodiment, the dispenser provides a reservoir for holding a number of tablets, such as, for example, 50 to 100 tablets. In yet another embodiment, the dispenser is provided with a housing that is constructed in part of plastic material of a substantially water impermeable material, such as polypropylene ("PP") or polyethylene ("PE"), while other parts of the housing are constructed of an elastomeric material of a substantially water impermeable material such as an ethylene propylene diene terpolymers (EPDM).

For purposes of the present invention, a dispenser of the present invention is "moisture tight" with the test protocols set forth in United States Pharmacopoeia (USP) 671. In one embodiment, the dispenser is considered "moisture tight" where not more than one of the 10 test dispenser exceeds 100 mg per day, per liter, in moisture permeability. Testing for USP 671 is conducted on sealed containers and on containers that have been opened and then resealed. The testing consists of a desiccant of set quantity 4–8 mesh, anhydrous calcium chloride being first dried at 110 degrees for one hour then cooled in a desiccator. Then 12 containers of uniform size are selected and opened and closed 30 times each. Torque is applied to the closures as specified in the USP monograph. Desiccant is then added to 10 of the packages labeled test containers. These are then filled to within 13 mm of the opening on containers larger than 20 ml and to two-thirds full on containers smaller than 20 ml. The closures are then applied to the torque specified in the monograph. Weight is recorded to the nearest 0.1 mg for containers smaller than 20 ml, to the nearest mg for 20 ml to 200 ml, or to the nearest centigram if the container is larger than 200 ml. The containers are stored at 75 percent, plus or minus three percent, relative humidity at a temperature of 23 degrees, plus or minus two degrees. After 36 hours, plus or minus one hour, the weight is recorded, with the moisture permeability calculated in mg per day, per liter.

Elastomeric materials of the present invention should be sufficiently deformable to allowed them to be sufficiently deformed when a force is applied to them so that the solid object can pass through the desired exit location. In one embodiment, the elastomeric material is used to construct a lip seal, that is, a specified opening provided in the elastomeric material. The lip seal remains moisture tight when the seal is closed, and is opened only for the time needed to pass a tablet through the opening. In another embodiment, the elastomeric material is used to encase the trigger mechanisms that are used to eject the tablets.

In yet another embodiment, the present invention is directed to dispenser mechanisms for dispensing one tablet at a time from the reservoir. In another embodiment, the dispensers are provided with dispensing mechanisms that queue up the tablets prior to dispensing them. In a further embodiment, the present invention is directed to a number of trigger mechanisms that are employed in dispensing one tablet at a time from the dispenser. In yet another embodiment, the trigger mechanism and location in the dispensers where the tablets queue up are placed within elastomeric materials to insure moisture tightness and further allow the trigger to be operated by applying a force external to the elastomer.

In yet another embodiment the dispenser is sized so that the housing interiors are sized only as thick as one tablet. In another embodiment, the dispenser maintains a moisture-tight seal within the tablet reservoir throughout the dispenser use life. In another embodiment, a desiccant, such as a desiccant entrained plastic, is used in at least a portion.

DETAILED DESCRIPTION OF THE INVENTION

Figure 2:
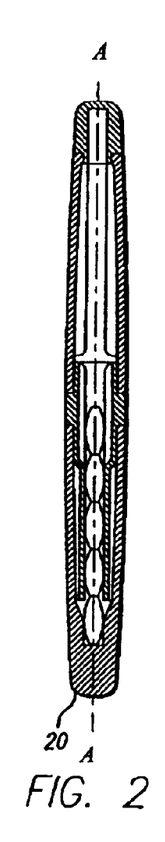
FIG. 2 is a cross sectional view along line A—A, as shown from the dispensing side of the dispenser shown in FIG. 1.
Figure 3:
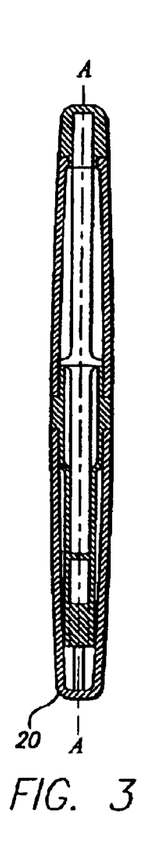
FIG. 3 is a is a cross sectional view along line A—A, as shown from the pusher side of the dispenser shown in FIG. 1.
Figure 4:
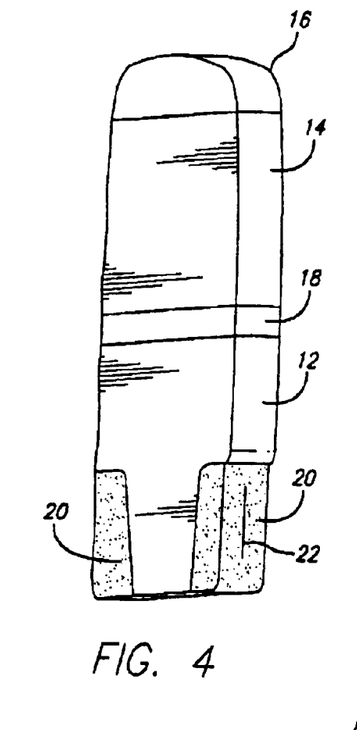
FIG. 4 is a first perspective view of the dispenser embodiment.
Figure 5:
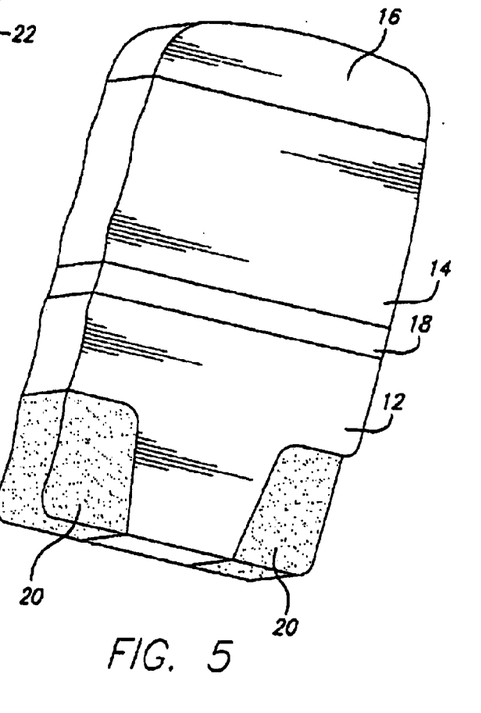
FIG. 5 is a first perspective view of the dispenser embodiment.

FIGS. 1–5 illustrate a first embodiment of a dispenser produced in accordance with the invention. FIGS. 4 and 5 show perspective views of the components that house the tablets and dispenser mechanism. Generally, dispenser 10 is provided with a lower housing 12, upper housing 14, a cover 16, a seal 18 that joins the lower and upper housings, and a cover 20 of an elastomer that covers the portions of the lower housing where the dispensing mechanism is located. A lip seal 22 is provided in the elastomer through which a tablet is dispensed.

For purpose of the present invention, a "lip seal" is formed by two lip sides that converge at the thin, slit like opening. In one example, the "lip seal" is formed by molding the two lip sides that converge at a thin slit-like opening. In another example, the "lip seal" is formed by molding a membrane and then cutting a slit in the membrane. The lip seal is designed so that it is opened for a sufficient time needed to pass an item through it as a sufficient ejecting force is applied to the item.

In one embodiment, the housing components of the dispenser may be provided with long sides that have a slight curvature and endwalls 31, 31' joined to the sidewalls by corners which are squared or rounded. The housing components are hollow in their interior and house the tablets and the dispensing mechanism. In another embodiment, the interior width dimension of the housing components may be only slightly greater than the width of a singular tablet that would be housed in the dispenser. This arrangement of a tablet reservoir provides for the housing and storage of the tablets in a single-thickness arrangement.

The housing components are formed of an injection molded plastic (e.g. clarified polypropylene or polyethylene). If a clarified plastic is used, the tablets contained in the dispenser are visible from outside the housing. In one embodiment, the outer surface of the upper housing may be made of a sufficiently water impermeable plastic (e.g. PP or PE) and at least a portion of the inner surface may be overmolded with a desiccant plastic, such as the desiccant plastic formulations disclosed in U.S. Pat. Nos. 5,911,937, 6,214,255, 6,130,263, 6,080,350 and 6,174,952, 6,124,006, 6,221,446 and U.S. Ser. No. 09/504,029, filed Feb. 14, 2000, all of which are incorporated herein by reference.

Figure 1:
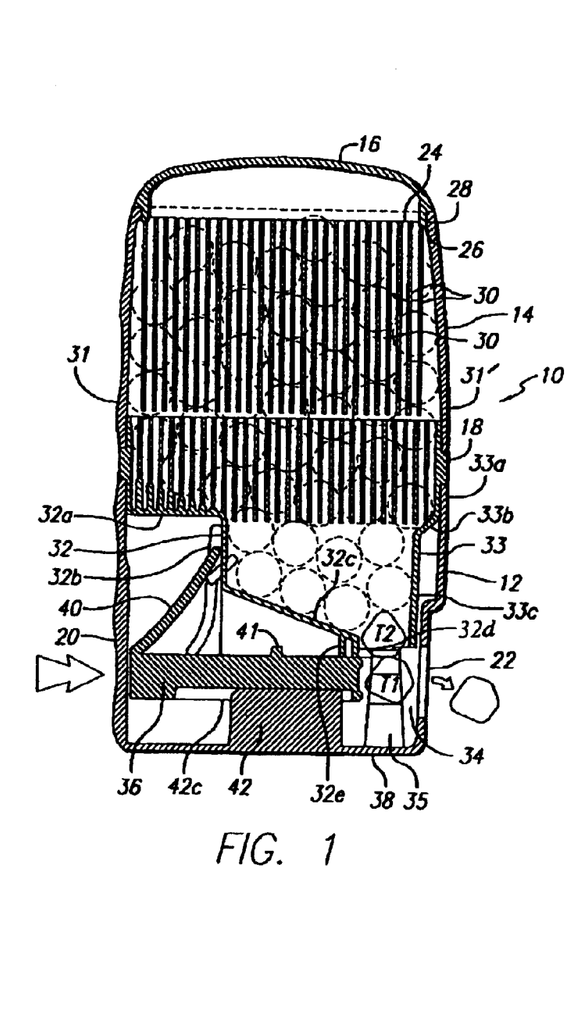
FIG. 1 is a cross sectional view of a first embodiment of a dispenser of the invention.

FIGS. 1–3 illustrate one embodiment of the internal components of the dispenser. Cover 16 is joined to the upper housing via seal 24. Seal 24 is provided with a downwardly extending tab 26 that terminates in a horizontally extending portion that locks into undercut 28 on the upper housing 14. Seal 24 can be any conventional sealing mechanism such as compression or interference fit. Alternatively, an elastomeric material can be overmolded over the region to be sealed in accordance with the principles discussed elsewhere in this disclosure.

In a further embodiment, the upper housing 14 is provided with ribs 30 that line the interior of the upper housing, which extend into the interior thereof. The ribs 30 help maintain the tablets in single-tablet thickness.

In a further embodiment, the lower housing 12 is joined to the upper housing 14 via seal 18, formed of Low Density Polyethylene (LDPE) or other suitable material. The seal 18 can be any type of seal that results in a moisture tight sealing arrangements for container and cap assemblies. Alternatively, an elastomeric material can be overmolded over the region to be sealed in accordance with the principles discussed elsewhere in this disclosure.

In another embodiment, the interior of the lower housing 14 is provided with guidepiece 32 that directs the tablet toward the dispensing zone 34. For example, guidepiece 32 gradually reduces the area in which a tablet can reside as the tablet moves downward through the housing and approaches the dispensing zone 34. In one specific embodiment, as shown in FIG. 1, the guidepiece has four regions: a first region 32a in which the guidepiece extends horizontally from an endwall 31 to a location in the lower housing, a second region 32b in which the guidepiece extends vertically above the dispensing zone for a preselected distance, and a sloped region 32c wherein the guidepiece slopes downward as it traverses the horizontal direction from the second region 32b to just above the dispensing zone 34. The guidepiece terminates in a fourth region 32d which extends vertically and may contact the upper surface of the tablet ejector 36. A second guidepiece 33 is provided. Guidepiece 33 extends from endwall 31' in three regions 33a, 33b, and 33c.

Due to the configuration of the guidepiece as just described, and the assistance of gravity, the tablets follow a path as they descend through a region having a gradually decreasing area, to a point where a tablet T2 is positioned just above the dispensing zone.

In one embodiment relating to an ejector, A tablet T1 in the dispensing zone is at rest on platform 35, placing it between the ejector 36 and lip seal 22. The tablet ejector 36 is positioned below the guidepiece 32. The tablet ejector has a length dimension that extends from the endwall 31 where the ejector 36 is activated to the dispensing zone 34. A spring 40 is formed unitary with the ejector 36, and extends vertically away from the ejector, from a location near the endwall 31 to a location where the spring contacts the second region 32b of the guidepiece 32. Also, a trigger guide 42 that rises from the bottom wall 38 of the lower housing 12 is provided. The trigger guide may be provided with a slot that resides between two prongs 42a (not shown), or, as shown in FIG. 3, the ejector may be provided with a forked bottom that receives the blade of the trigger guide. In any event, the trigger guide maintains the ejector in a straight path as it travels from the rest position the eject position.

In yet another embodiment, the lower housing 12 is formed of two regions: a substantially moisture impermeable plastic region and an elastomeric region 20, such as EPDM, (e.g. commercially available under the trade name SANTOPRENE®). For example, the lower housing may be over-molded either in a two-shot injection molding machine or made in two injection molding processes (that is, injection mold the plastic in mold 1, then over-mold the elastomeric material in mold 2). In the embodiment shown in FIGS. 4 and 5, the elastomeric region 20 covers the sidewalls at the end where the ejector is activated, and at the opposite end where the slit 22 is located. The elastomeric material (or suitable comparable material) is sufficiently deformable so that the user can impart a sufficient force to the ejector so as to activate it and thus, the tablet can then moved through the slit and be ejected.

In one specific embodiment of the operation of one embodiment of the dispenser of the present invention, a user presses on the endwall 31 of the lower housing 22 where the ejector is located. A force is transmitted through the elastomer 20, and the ejector 36 is moved into the dispensing zone 34, where it contacts a tablet and forces it out of the slit 22 in the elastomeric material 20 on the opposite endwall 31'. At this time, the ejector is in the extended position and prevents any other tablet from entering the dispensing zone. As the ejector is moved into the dispensing zone 34, the spring 40, which is unitary with the ejector, goes into compression and stores energy. Once the user ceases to apply a dispensing force, the spring 40 pushes against the second portion 32b of the guidepiece 32, releasing its energy and returning the spring to the original position. When the ejector is retracted, a tablet drops into the dispensing zone for the next dispense cycle.

In yet another embodiment, the ejector may be provided with vertically extending positive stop 41 that can provide an impediment to further travel of the ejector when it comes into contact with stop 32e that extends from the guidepiece 32.

In one example, the slit 22, which is formed in the endwall 31', is a lip seal that is moisture-tight throughout the dispenser use life.

In another embodiment, shown in FIGS. 17–20, a housing 12' has a major portion 14' and a sidewall 16', which assembles to the major portion in the same manner in which the cover 16 assembles to the upper housing 14, as discussed in relation to FIGS. 1–5.

In yet another embodiment, The interior of the dispenser of this embodiment is the same as the interior for FIGS. 1–5.

A region of deformable, moisture tight material (e.g. elastomer) covers the portion of the ejector where the ejector is actuated. The ejector button 37' is provided with a bulbous shape.

Figure 18:
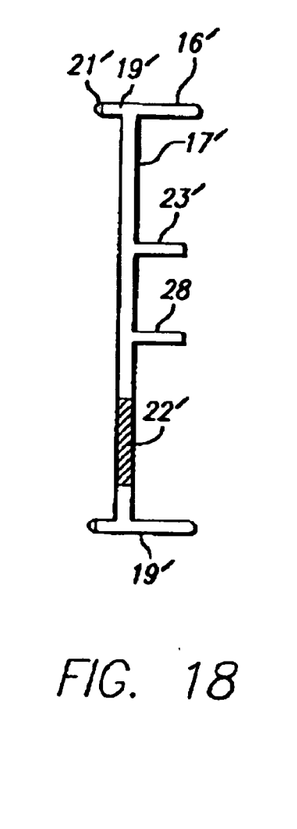
FIG. 18 is a side elevational view of an aspect of the embodiment shown in FIG. 17.
Figure 19:
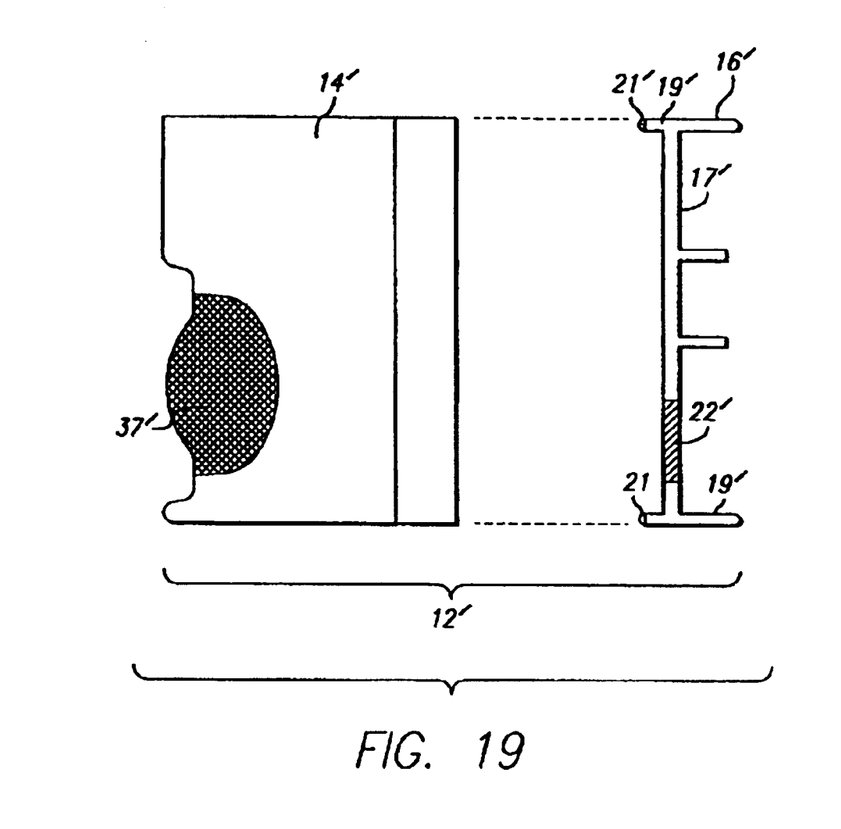
FIG. 19 is an exploded view of the embodiment shown in FIG. 17.
Figure 20:
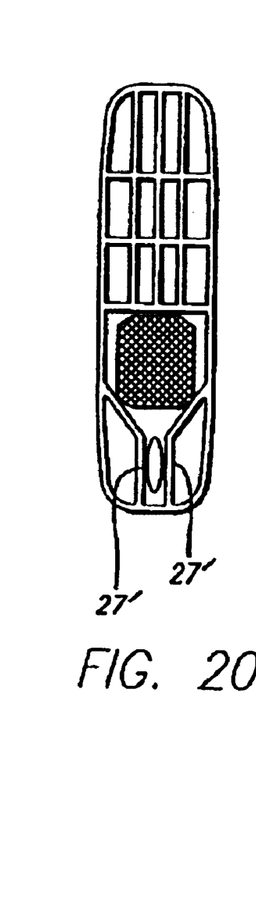
FIG. 20 is a bottom plan view of the embodiment shown in FIG. 17.

As shown in the embodiment of FIG. 18, the sidewall 16' has a wall portion 17' provided with horizontally extending end portions 19' that extend along the inner walls of the major portion 14' of the housing 12', when the sidewall 16' is assembled in the housing 12'. The ends of the horizontally extending portions 19 are covered with elastomer 21' to provide a seal with the inner walls of the major portion 14'. The wall portion 17' is provided with the lip seal 22' through which the tablet is dispensed. The wall portion 17' is joined to the horizontally extending portions 19 at point along the horizontally extending portions 19 that is between the ends of said portions. Thus, when the sidewall 16' is assembled to the major portion 14', the wall portion is recessed, residing within the volume defined by the major portion. Further, as shown in FIG. 20, the recessed portion is provided with tapered walls 27' that reduce the area of the recess into which the tablet is dispensed.

Figure 21:
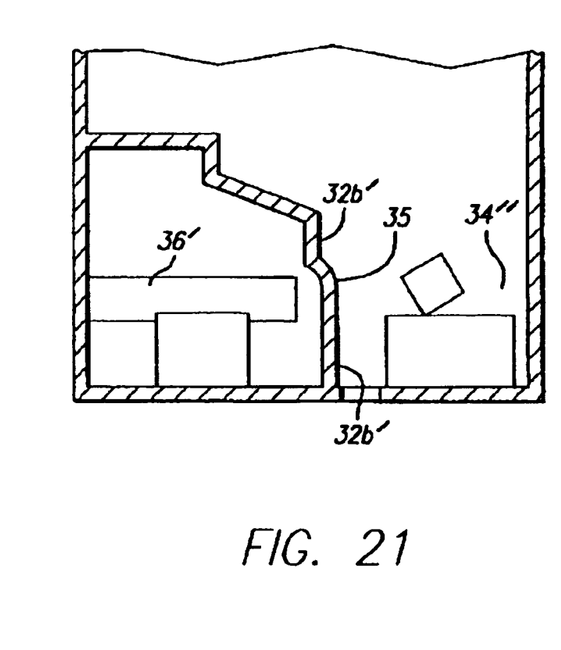
FIG. 21 is a cross sectional view of another embodiment of the present invention.
Figure 22:
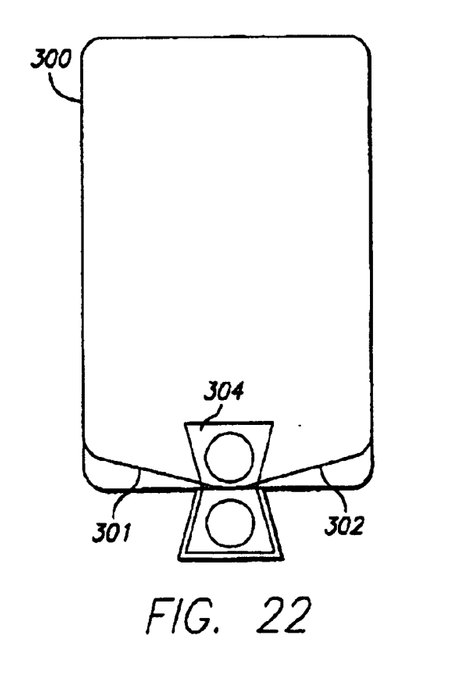
FIG. 22 is a side elevational view of another embodiment of the present invention.

FIG. 21 shows another embodiment for an ejector assembly that can be substituted for the ejector assembly shown in the embodiments of FIGS. 1–5. Here, ejector 36" is maintained in a compartment that may not be moisture tight, that is defined in part by the guidepiece. A vertically extending guidepiece portion 32b" having a deformable membrane 35 is positioned between the ejector 36" and the dispensing zone 34". The elastomeric membrane is deformable when the ejector is actuated and contacts the tablet and pushes the tablet out of the dispenser.

Figure 6:
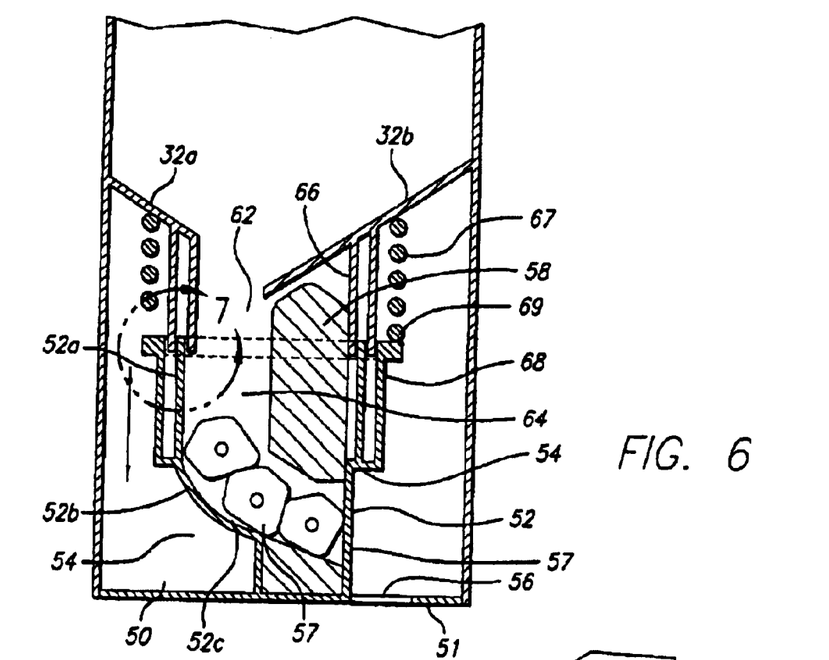
FIG. 6 is a side elevational view of another embodiment of the present invention.
Figure 7:
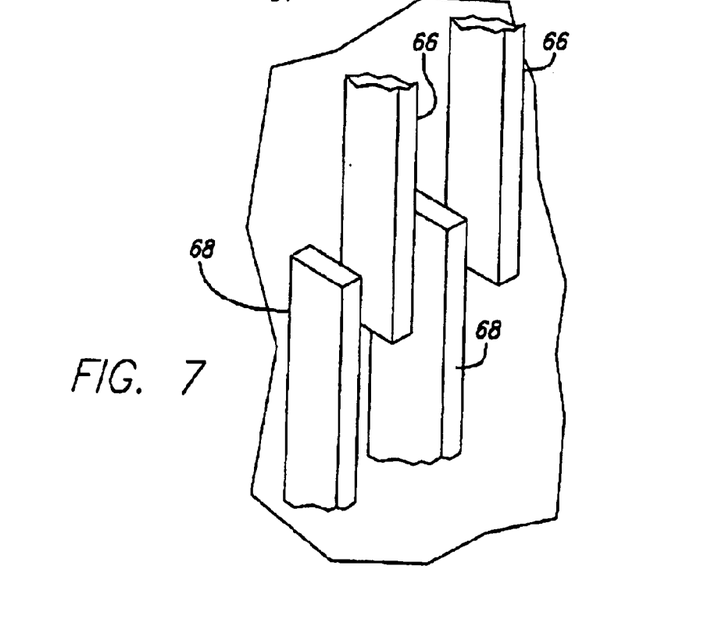
FIG. 7 is a perspective view showing an aspect of the FIG. 6 embodiment.
Figure 8:
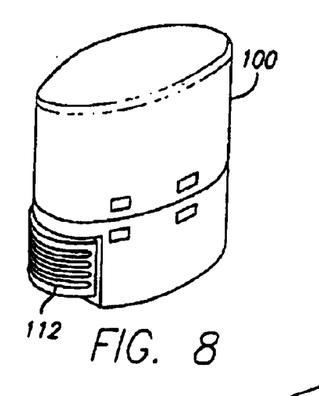
FIG. 8 is a perspective view of another embodiment of the present invention.

Another embodiment, shown in FIGS. 6 and 7, employs a variation on a dispenser zone arrangement, and does not employ an elastomeric material. The upper housing, lower housing, cover and seal may be constructed as described above, except as modified by the following disclosure. As shown in FIG. 6, a pair of guidepiece components 32' and 32", one of positive slope, the other of negative slope, are located at the bottom of the lower housing. As a result of this arrangement, the guidepieces will direct tablets to the dispensing zone. Below the lower housing is a dispensing plunger positioned within the housing at the lower end thereof. The dispensing plunger has a bottom 51 provided with an opening 56 through which pills exit the dispenser.

The dispensing plunger 50 includes first and second sides 52 and 54. The second side 54 extends substantially vertical. The first side 52 of the dispensing plunger 50 is provided with a vertical portion 52a, a curved portion 52b and a sloped portion 52c, which leads the tablets to the dispensing position. A stationary block 58 is mounted on the interior side of the first side 52, below the guidepiece 32". The lower ends of the guidepiece components 32a" and 32b" terminate above the dispensing zone. An opening 62 between the guidepieces is positioned at the top of a chute 64, into which tablets queue up single-file for dispensing. The chute is bounded on one side by the sidewall 52 and the other side by stationary block 58.

The lower end of the lower housing is provided with a double wall arrangement, which resembles a pair of forked prongs 66, which receive a complimentary pair of forked prongs 68 that extend upward from the double sidewall arrangement of the dispensing plunger 50. As shown in FIG. 7, the prongs 66 and 68 are frictionally engaged with each other. The lower housing 66 is further provided with a spring seat 69, in which seat the end of a spring 67 resides. The spring 67 biases the dispensing plunger downward, in its extended position.

In one embodiment, to dispense a tablet from the dispenser, the user pushes the bottom 51 of the dispensing plunger 50 upward from the extended position, causing the tablet to press against the stationary block, and be ejected through the moisture-tight lip seal 57 in second sidewall 54. The tablet then drops through the opening 56. Once the user ceases to apply the dispensing force, the spring returns the dispensing plunger to the extended position.

Another embodiment of a moisture tight dispenser is shown in FIGS. 8–13. This dispenser is may be used for spherical or round-shaped tablets. The upper housing 99 is an injection-molded component which may be constructed of a substantial moisture impermeable material (e.g. polypropylene or polyethylene). In another embodiment, the outer surface of the upper cover may be made of a substantial moisture impermeable material and the inner surface may be overmolded with desiccant plastic, using a desiccant polymer blend such as the ones disclosed in such as the desiccant plastic formulations disclosed in U.S. Pat. Nos. 5,911,937, 6,214,255, 6,130,263, 6,080,350 and 6,174,952, 6,124,006, 6,221,446 and U.S. Ser. No. 09/504,029, filed Feb. 14, 2000, all of which are incorporated herein by reference. For example, the two material part may be made in a two shot injection molded process.

As shown, the upper housing has a top surface 101 and a sidewall 102 that depends downwardly from the top surface. The housing has an oval shape. However, this is a design choice and other shapes may be selected. The upper cover 102 is provided with slots 103, with two on each side of the housing, although just one set is shown in the Figures. The slots are used in the assembly of the dispenser mechanism, in order to join all of the components.

The dispenser mechanism 104 is constructed of two components: a base component 105 sized and dimensioned to fit within the upper housing (as shown in the Figures, it is oval shaped), and an elastomeric top surface 106 that extends around the circumference of the top surface is sealed over the base component. The base component 105 may be molded of a substantial moisture impermeable material polypropylene or polyethylene. The elastomeric top surface may be formed of an elastomeric seal material, such as EPDM, commercially available under the trade name SANTOPRENE®. The base component 105 is provided with tabs 107 that project out from the sidewalls of the base component. The tabs 107 are positioned and sized so that when the dispenser is assembled, the tabs will enter and become engaged in the slots 103 on the upper housing. Likewise, a second set of tabs 108 are provided that are sized and dimensioned to become engaged in slots 118 provided on the lower housing 120.

The assembly of the upper cover and the dispenser mechanism forms the reservoir. That is, the tablets fill the interior of the upper housing, with the reservoir's bottom surface being the top surface 106 of the dispenser mechanism. The elastomeric top surface 106 creates a moisture-tight seal in the upper housing.

The elastomeric top surface 106 has a funnel shape that, at its lowest portion, has an opening 109 that is sized so that tablets can drop into a tube 110 that extends downward from the opening 109, into the lower housing 120 of the dispenser. In one embodiment, the tube is constructed of two materials: (1) a harder plastic material such as PP or PE, and, on its trigger facing side, the tube is formed of (2) a relatively deformable elastomer. The ends of the tube are constructed of elastomer to form a moisture-tight seal with the door 118. See FIG. 9. The plastic provides rigidity and the elastomer allows the tube to be partially deformed during the dispensing action, as will be explained in detail below. The tube is appropriately dimensioned on its interior so that tablets move through it single file.

Figure 9:
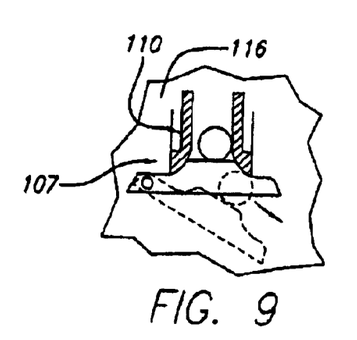
FIG. 9 is an exploded view of another embodiment of the present invention.

Lower housing 120 is provided with a bottom surface 121 and a sidewall 122 that depends upward from the bottom surface 120. Inner walls 123 are provided along the sides of the inner sidewalls. Though only one inner wall 123 is shown in FIG. 9, an inner wall also is provided against the sidewall in the foreground. Inner wall has a horizontal surface 124 and a sloped surface 125.

The trigger 111 is provided with a push button 112, a platform 113 that extends from the push button 112 into the interior of the dispenser, a vertical support 114 that is mounted to the platform 113, on which support 114 is mounted a spring 115 and pushing element 116. The platform 113 is further provided with guide elements 117 that extend out from the sides of the platform. At the end of the platform is a door 118 that extends further into the interior of the dispenser. The upper surface of the door is provided with a truncated cone 119. A pair of guide elements 117' extend out from the door 118. The push button, platform, vertical support, spring, and pushing element may be constructed of polypropylene or a polyethylene. The door and truncated cone may be constructed of an elastomer such as acetal POM.

Figure 10:
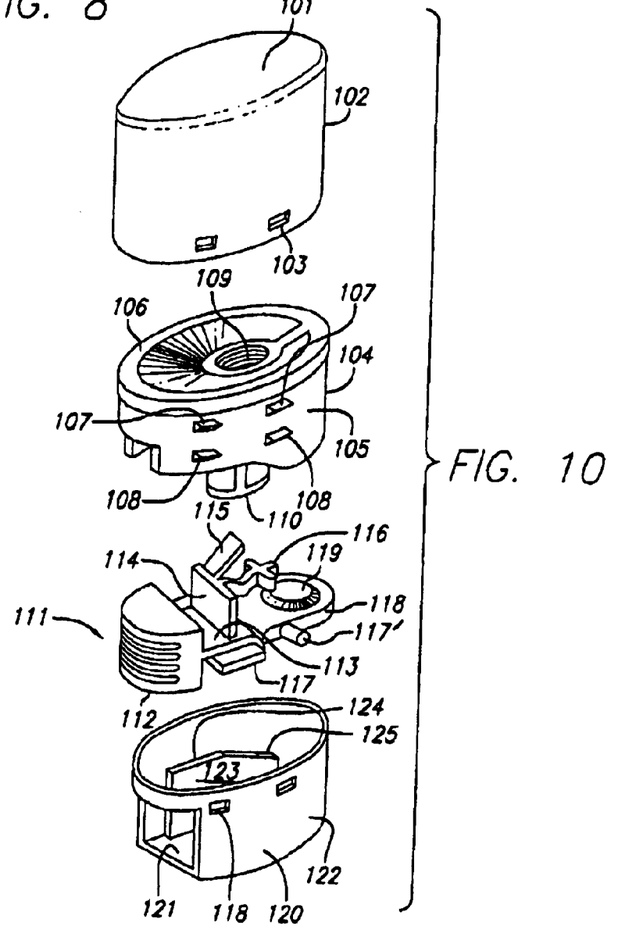
FIG. 10 is a perspective view of the dispensing portion of the present invention.

As shown in FIG. 10, the door 118 of the trigger 111, in conjunction with the truncated cone 119, are positioned over and in the opening of the tube 110, thereby forming a moisture-tight seal that substantially reduces the ingress of moisture into the tube and into the tablet reservoir above the tube. The pushing element 116, which is also part of the trigger mechanism, is positioned adjacent the tube, and specifically, adjacent a location of the tube that is formed of the relatively soft elastomeric material. Also, the guide elements 117, 117' of the trigger mechanism are at rest on the horizontal portion 124 of the inner sidewalls 123 provided on the lower housing, just adjacent the sloped portion 125 of the inner sidewalls.

Figure 11:
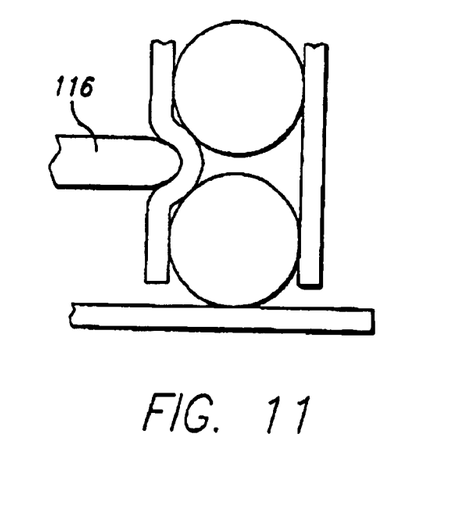
FIG. 11 is a cross-sectional view of the dispenser just prior to dispensing of a tablet.

The dispenser is operated as follows. The force of gravity causes tablets to fall into the tube. A bottom-most tablet rests at the bottom of tube, on the door 118. The button of the trigger mechanism is pushed into the dispenser. The entire trigger mechanism moves in the direction in which the force is applied. The guide elements 117' of the door 118 move down the sloped surface, causing the door to open. As the door opens, a tablet is dispensed out of the tube. The tablet drops into the lower housing and out through an opening (not shown) that is provided therein. Simultaneous to the opening of the door, the pusher element 116 of the trigger element contacts the tube and exerts a force to the relatively soft elastomeric material of the tube, thereby deforming the elastomeric region, as best seen in FIG. 11. The inward deforming of the tube reduces the size of the tube, thereby preventing the tablets other than the one resting on the door from being dispensed. This insures that only one tablet is dispensed for each application of dispensing force. After the tablet is dispensed, the dispensing force is removed, and the biasing spring returns the trigger mechanism to the rest position. The door again seals the bottom of the tube, and the pusher element retracts from the tube. The tablet that had been restrained from dropping down when the tube was deformed then falls onto the door.

Figure 12:
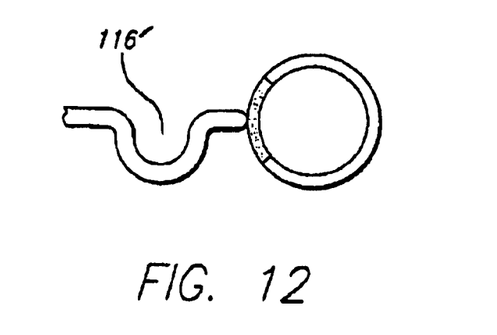
FIG. 12 is a top plan view of an alternative embodiment of the present invention.
Figure 13:
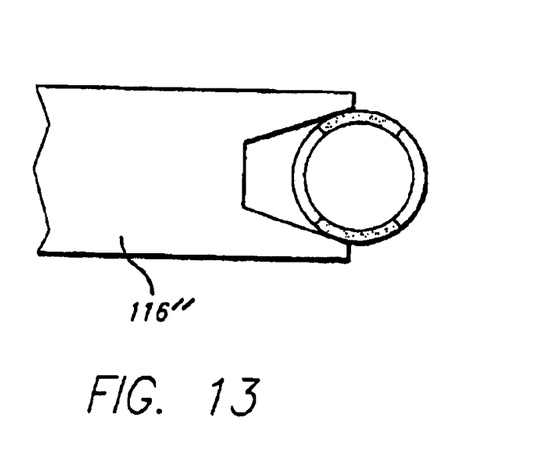
FIG. 13 is a top plan view of an alternative embodiment of the present invention.

In one embodiment, pusher element 116 is shown as having a cross shape in FIG. 9. Alternatively, pusher element 116' may take a serpentine shape (FIG. 12). A further alternative is to employ a pusher element 116" that has a V-shaped notch. In this embodiment, the tube may be modified so that the elastomeric regions of the tube are lateral to the tube side that faces the pusher element. When activated, the sides of the V-shaped notch contact and deform the elastomeric regions of the tube. This arrangement is shown in FIG. 13.

Figure 14:
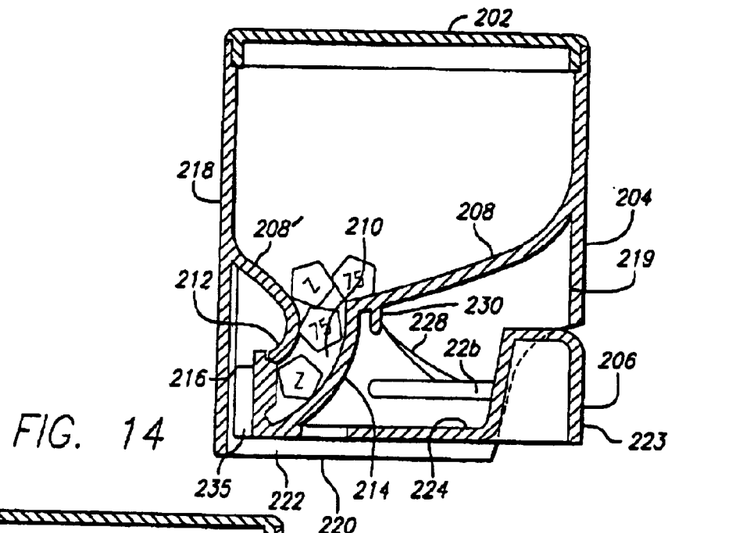
FIG. 14 is a cross sectional view of a fourth embodiment of the present invention.
Figure 15:
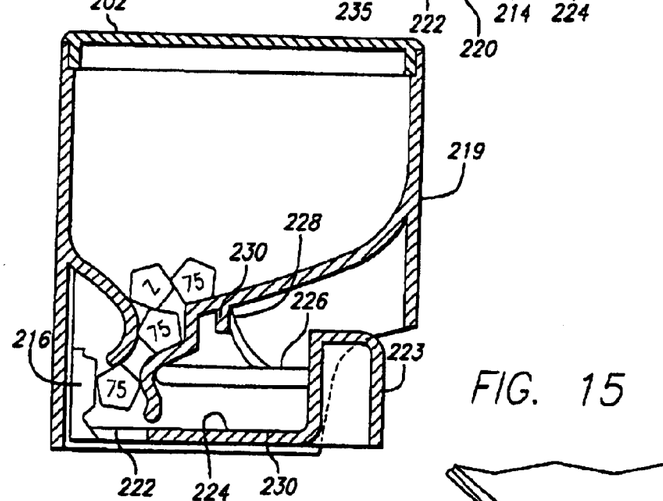
FIG. 15 is a cross sectional view of a fourth embodiment of the present invention in which the trigger mechanism is activated.
Figure 16:
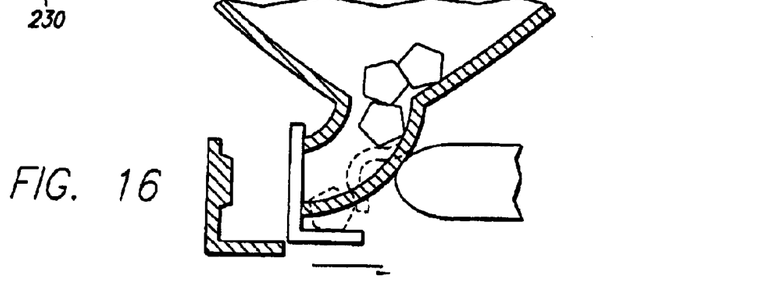
FIG. 16 is a perspective view of an aspect of the present invention.
Figure 17:
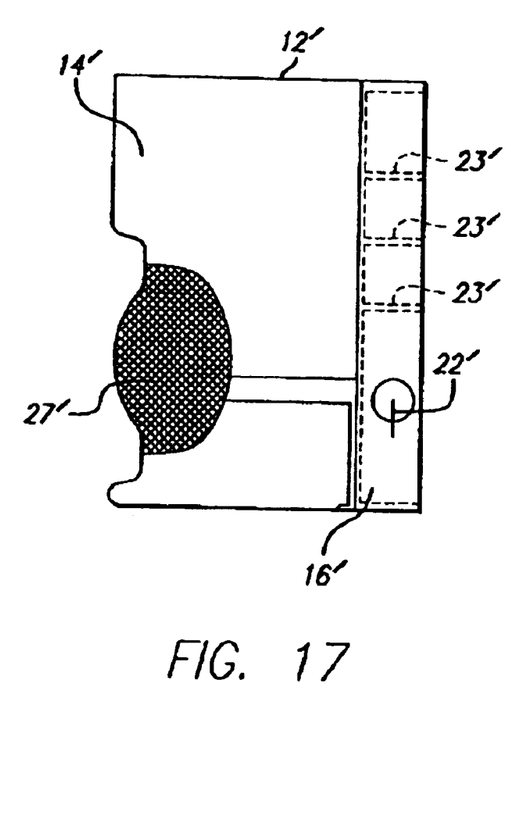
FIG. 17 is a perspective view of another embodiment of the present invention.

In a fourth embodiment shown in FIGS. 14–16, the dispenser 200 is provided with a cover 202, a housing 204, and a trigger mechanism 206. An elastomeric seal may be overmolded where the cover joins the housing to provide a moisture-tight seal. The interior of the housing is provided with a sloped guidepiece or guidepieces 208, 208' that direct tablets, with the aid of gravity, to an opening at the top of a chute 210 having sidewalls 212, 214 formed of a soft elastomeric material, in which the tablets queue up for one-at-a-time dispensing. The ends of the guidepieces 208, 208' are overmolded with the elastomeric material that forms the tube sidewalls 212, 214 in order to form a moisture-tight seal. On the bottom side 220 of the housing, an opening 222 is provided through which tablets can be dispensed.

The trigger mechanism 206 includes a button 223 positioned on the end wall 219 that is opposed to the backstop. A guide element 224, which extends along the bottom side 220 of the housing, is joined to the button 223. The guide element 224 has an opening 235, substantially the same size as the opening 222 in the housing. The guide element 224 is further provided with a vertically extending backstop 216. A pusher element 226 extends horizontally from the button 223 towards the sidewall 214 of the tube. A spring 228 extends from the pusher element towards a spring force receiving member 230 that depends downward from the bottom side of the guidepiece 208. The guide element 224 of the trigger mechanism 206 extends horizontally along the bottom side 220 of the housing.

When the trigger mechanism 206 is in the rest position, the ends of the sidewalls 212, 214 and the backstop 216 are sealingly engaged with each other, so that moisture entering the tube is substantially reduced. Also, when the trigger mechanism is in the rest position, the opening 325 in the guide element 224 is offset from the opening 222 in the bottom wall of the housing.

The housing can be constructed of a substantially moisture impermeanble plastic. An elastomeric seal can be over molded at the location where the cover 202 joins the housing, in order to provide a moisture tight seal at that location. For example, the housing can be constructed of PP or PE that is further provided with an overmolded elastomeric seal that covers the trigger mechanism 206. The elastomeric material also forms the tube in which tablets line prior to being dispensed. For example, the trigger can be constructed of PP or PE, with Acetal POM overmolded on all surfaces. The spring element of the trigger can be constructed of PP or PE.

Tablets are dispensed in the following manner. The trigger is in the rest position, and a tablet is located at the lowermost region of the tube. A moisture-tight seal is provided between the ends of the tube and the backstop. When the trigger is depressed, the guide piece moves away from end wall 219, which causes backstop 216 to move away from the ends of the tube 212, 214. As this is occurring, the opening 235 in the guide element 224 moves toward the opening 222 in the housing and aligns therewith. As a result of these actions, a tablet drops out of the tube and through the aligned openings. Also, at this same time, the pusher element 226 contacts the tube wall 214, and, since that portion of the tube is formed of a relatively soft elastomeric material, the tube is deformed by the inward movement of the pusher element, preventing additional tablets from exiting through the dispensing hole.

When the trigger is depressed and moves inward, the spring element 228 stores energy. When the user of the dispenser no longer applies a dispensing force, the energy in the spring element causes the trigger element to return to the rest position. The pusher retracts from the tube, returning the pusher to its original shape and position, Also, the backstop returns to the moisture-tight sealing position with the end of the tubes portions 212, 214 as the guide element 224 retracts. Another tablet will assume the lowermost position, and will be the next tablet dispensed.

FIGS. 22–26 show another embodiment in which the dispenser is provided with a housing 300 that, on its interior, is provided with a triangular shaped walls 301, 302 of positive and negative slope in which the triangular walls slope towards the middle and converge at a dispensing zone 304. The housing is dimensioned so that the interior of the dispenser is approximately one tablet wide. Gravity, in conjunction with the triangular shaped bottom of the dispenser, directs the tablets into the dispensing zone 304. Alternatively, the bottom of the housing can be provided with the triangular shaped walls, and the dispensing zone can extend down from between the triangular shaped walls.

Figure 23:
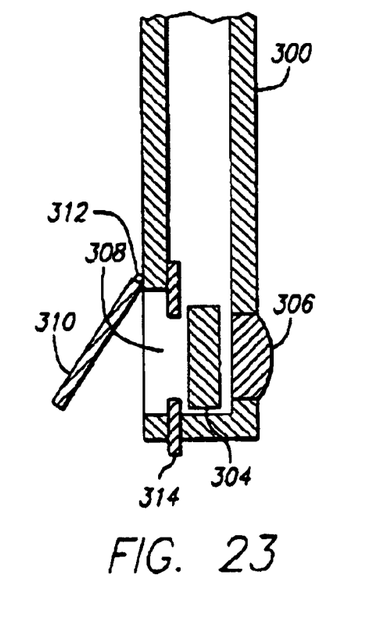
FIG. 23 is a cross sectional view of the embodiment shown in FIG. 22, taken from the side thereof.

The housing can be formed of a substantially moisture impermeable material such as. PP or PE. One side of the dispensing zone 304 is provided with a button 306, formed of a relatively elastomeric material. The opposite side of the cavity is provided with an opening 308 sized to allow a tablet to pass out of the cavity. A door 310 that is joined to the cavity by a hinge 312 covers the opening. Optionally, as shown in FIG. 23 a thin diaphragm layer 314 may be provided between the opening and the door.

To dispense a tablet, the user presses on the elastomeric button 306. The force is transferred to the tablet, which presses against the door 308, forcing it open and then forcing the tablet out of the opening. Once the tablet exits the dispenser, the user pushes the door shut. The next tablet drops into position, and will be dispensed when the user is ready to dispense it.

In yet another embodiment, the button is formed of a material other than an elastomer. For example, the button can be formed of LDPE. Also, the LDPE button can be molded into a relatively thinner plastic region, when compared to the thickness of the plastic of the sidewalls of the container and of the wall thickness of the other portions of the dispensing zone. With this structural arrangement, the dispenser can be formed in a one shot molding operation.

Figure 24:
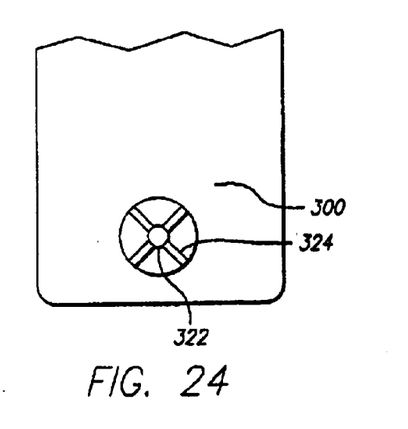
FIG. 24 is a side elevational view taken from inside a dispenser, showing an embodiment of the present invention.

In a further embodiment, FIG. 24 shows a pusher element 320 having a structure that includes spokes 324 arrayed around a hub 322 and joined thereto. The pusher element is positioned in the interior of the dispensing zone, between the button and, when the item is in the dispensing zone, the item to be dispensed. The pusher element is joined to the perimeter of the housing. The pusher element is immediately adjacent to, if not abutting, the button. When a force is applied to the exterior side of the button, force is transferred to the pusher element, which pushes against the tablet and dispenses it from the cavity in the manner described above.

Figure 25:
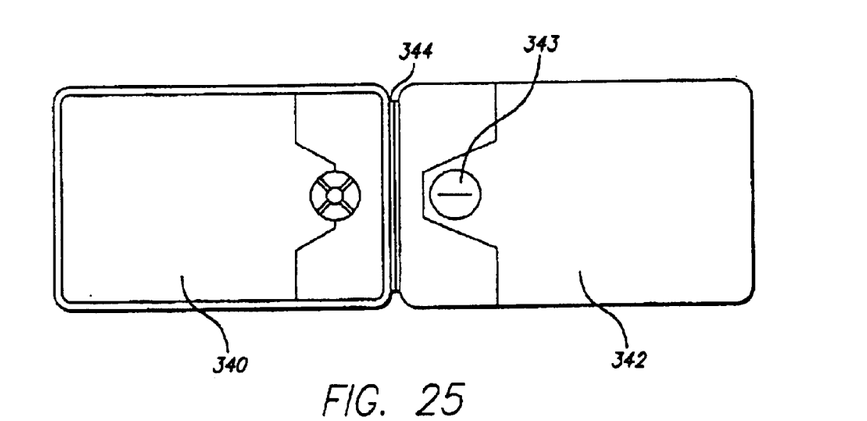
FIG. 25 is a top plan view of the embodiment shown in FIG. 22, in an open position.

FIG. 25 shows one embodiment of the dispenser of preceding figures in an open position, suitable for loading. The dispenser is provided with first half 340 and second half 342, joined by a hinge 344 can be loaded by placing the dispenser in a flat, open position in which tablets are placed in a one-thickness-deep arrangement in one of the halves of the dispenser. The half of the dispenser not containing the tablets is closed on the half containing the tablets. The two halves can be provided with any of the structural arrangements described in this application for maintaining the joined components in a together.

FIG. 25 also shows the dispenser provided with a moisture-tight lip seal 343 through which tablets are dispensed. Lip seals have been described earlier in this disclosure.

Figure 27:
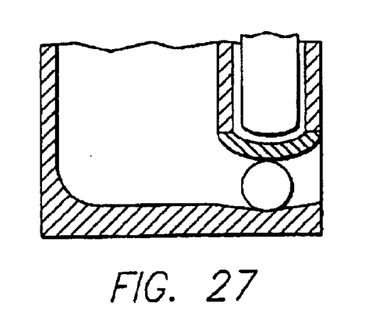
FIG. 27 is a perspective view of another tamper evident seal that can be employed with the embodiments discussed herein.

In another embodiment, the dispensing zone 304 is provided with a removable covering that provides evidence of whether the dispenser has been tampered with. There are several arrangements for effecting this. As shown in another embodiment, FIG. 27, the tamper evident seal can be a disc 328 that is attached to the perimeter of the 321 opening in wall by elements 330 spaced between perforations 333. See FIG. 27A. The elements 330 are broken when the tab portion 332, which is joined to the disc, is pulled away.

Figure 26:
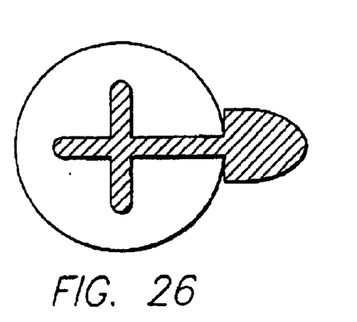
FIG. 26 is a perspective view of a tamper evident seal that can be employed with the embodiments discussed herein.

In yet another arrangement, shown in FIG. 26, a removable cross 334 is provided over the opening. The cross can be joined to the backing material with the elements and perforations described above. The cross is joined to a pull tab, which when pulled, removes the cross from the backing material, leaving a cross shaped opening through which tablets can be ejected.

What is claim is:

1. A dispenser for dispensing solid objects comprising a reservoir for retaining solid objects that is in communication with a dispensing zone having a resealable slit and an ejector positioned opposite a space for retaining a solid object, wherein the dispensing zone is positioned under the reservoir, wherein an elatomeric material is comprised of flexible soft material that deforms in the direction of the resealable slit in response to an ejecting force which causes the ejector to be moved into the dispensing zone where the ejector contacts the solid object and forces it out of the slit in the flexible soft material and, at the same time, the ejector is sufficiently shaped so, as when it is in an extended position, the ejector prevents any other solid objects from entering the dispensing zone, and wherein the slit is provided with a tamper evident seal that is constructed of frangible material.

2. The dispenser of claim 1 wherein the elatomeric material is comprised of an elastomer.

3. The dispenser of claim 2 wherein the ejector is comprised of LDPE.

4. The dispenser of claim 1 wherein the tamper evident seal is comprised of a disc frangibly joined to the opening and a tab joined to the disc.

5. The dispenser of claim 1 wherein the tamper evident seal is a comprised of a disc frangibly joined to the opening and a cross joined to the disc.

* * * * *